Nov. 17, 1964     J. B. MENEFEE     3,157,089

MEANS FOR ILLUMINATING INTERIOR OF UNDERGROUND SHELTERS

Filed June 1, 1962

*INVENTOR.*
Jerry B. Menefee

BY *Cecil L. Wood*

ATTORNEY

United States Patent Office 3,157,089
Patented Nov. 17, 1964

3,157,089
MEANS FOR ILLUMINATING INTERIOR OF UNDERGROUND SHELTERS
Jerry B. Menefee, 3541 La Joya Drive, Dallas, Tex.
Filed June 1, 1962, Ser. No. 199,319
2 Claims. (Cl. 88—58)

This invention relates to means for illuminating the interior of an underground shelter, and it concerns more particularly light refracting and reflecting means arranged to direct sun light downwardly from the surface of the ground and to diffuse it into the interior of a shelter in place below the surface.

The invention contemplates an elongated, retractable element, operable as a light refracting and reflecting lens, which in its extended position extends upwardly from the interior of an underground shelter, through the roof thereof, to a point above the surface of the ground, the retractable element in its extended position being arranged to direct sun light downwardly from the surface and to diffuse it into the interior of the shelter.

The invention further contemplates an elongated, retractable element, operable as a light refracting and reflecting lens, which is received telescopically in a tubular housing, the tubular housing extending through the roof of an underground shelter to a point above the surface of the ground, and the upper end portion of the retractable element, in its extended position, being positioned above the upper end of the tubular housing, whereby it is exposed to sun light, while at the same time the lower end portion of the retractable element extends below the lower end of the tubular housing, the upper end portion of the retractable element being enclosed within the tubular housing, whereby it is protected, in its retracted position.

The retractable element advantageously may comprise an elongated glass rod having circumferentially spaced spring tensioned means extending laterally outwardly therefrom for yieldable engagement with the inner wall of the tubular housing, whereby the retractable element is supported in the housing for telescoping adjustment relative thereto, the rod being generally cylindrical and having a surface coating of light reflecting material intermediate its ends, the rod having enlarged, light refracting end portions and being operable as a light refracting and reflecting lens adapted to direct sun light downwardly from the surface and to diffuse it into the interior of the shelter.

The retractable element may be readily removed from its tubular housing, when not in use, and replaced therein, as desired, from the inside of the shelter.

The invention will be readily understood by referring to the following description and the accompanying drawing, in which.

Figure 1:
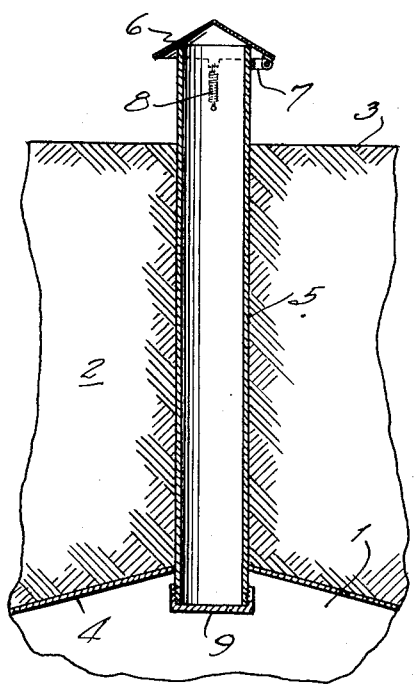
FIGURE 1 is a sectional elevational view showing a roof portion of an underground shelter in place, and showing a tubular housing for an elongated, retractable element, operable as a light refracting and reflecting lens, as described, with the retractable element removed therefrom.
Figure 2:
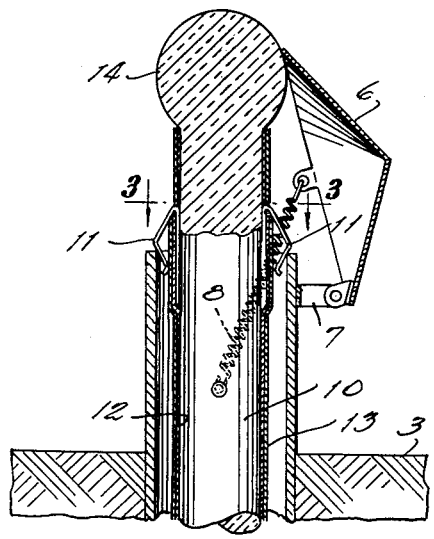
FIGURE 2 is a sectional elevational view on an enlarged scale showing the elongated, retractable element in its extended position in which its upper end portion extends upwardly beyond the upper end of the tubular housing therefor.

Referring to FIGURES 1 and 2 of the drawing, the numeral 1 designates generally an underground shelter, which is buried in the earth 2 below the surface of the ground, indicated by the numeral 3. The shelter 1 has a roof 4, which is shown fragmentarily.

The invention includes a tubular housing 5 which extends through the roof 4 of the shelter 1 to a point above the surface of the ground 3, and is rigidly connected intermediate its ends to the roof 4.

Figure 3:
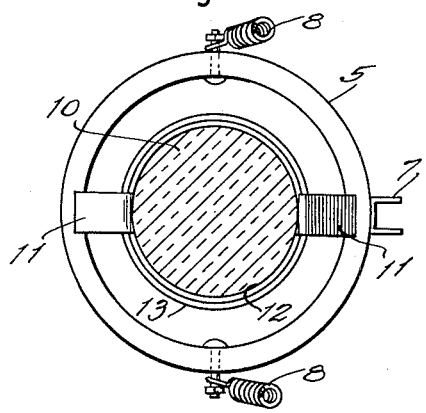
FIGURE 3 is a sectional plan view taken on the line 3—3 of FIGURE 2.

A dust cap 6, which in its closed position, as shown in FIGURE 1, provides a closure for the upper end of the tubular housing 5, has a marginal portion thereof connected by a hinge 7 to one side of the tubular housing 5 adjacent its upper end, and is biased in its closed position by a pair of diametrically opposed tension springs 8 which, as shown in FIGURES 2 and 3, are connected at their ends to the tubular housing 5 and the dust cap 6.

When the apparatus of the invention is not in use, and the elongated, retractable element, hereinafter described, is removed from the tubular housing 5, a threaded cap 9 advantageously may be removably connected to the lower end of the tubular housing 5, below the roof 4, as shown in FIGURE 1.

The numeral 10 designates generally an elongated, retractable element as hereinafter described, which is operable as a light refracting and reflecting lens.

In its extended position, as shown in FIGURE 2, the retractable element 10 extends upwardly from the interior of the shelter 1, through the roof 4 thereof, to a point above the surface of the ground 3. The retractable element 10 in its extended position is arranged to direct sun light downwardly from the surface 3 and to diffuse it into the interior of the shelter 1.

As shown in FIGURE 2, the retractable element 10 is received telescopically in the tubular housing 5. The upper end portion of the retractable element 10, in its extended position, as shown in FIGURE 2, is positioned above the upper end of the tubular housing 5, whereby the dust cap 6 is raised by abutment of the upper end of the retractable element 10 against it, and the upper end portion of the retractable element 10 is exposed to light, while at the same time the lower end portion of the retractable element 10 extends below the lower end of the tubular housing 5, the threaded cap 9 having been removed therefrom.

The upper end portion of the retractable element 10 is enclosed within the tubular housing 5, whereby it is protected, in its retracted position (not shown). Alternatively, the retractable element 10 may be removed entirely from the tubular housing 5 when not in use, as shown in FIGURE 1.

As shown in FIGURES 2 and 3, the retractable element 10 comprises an elongated glass rod having circumferentially spaced spring tensioned means, indicated generally by the numerals 11, extending laterally outwardly therefrom for yieldable, frictional engagement with the inner wall of the tubular housing 5, whereby the retractable element 10 is supported in the tubular housing 5 for telescoping adjustment relative thereto.

The glass rod which comprises the retractable element 10 is generally cylindrical, and has a surface coating 12 of light reflecting material intermediate its ends. The rod 10 has its intermediate portion further enclosed within an outer covering 13, which advantageously may consist of aluminum foil.

The glass rod 10 has enlarged, light refracting upper and lower end portions 14 and 15, and is operable as a light refracting and reflecting lens adapted to direct sun light downwardly from the surface 3 and to diffuse it into the interior of the shelter 1.

Figure 4:
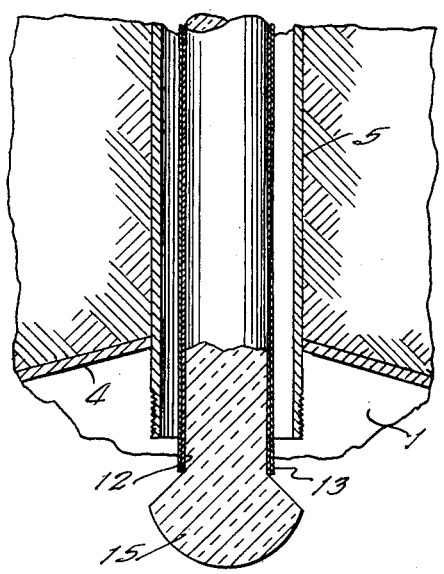
FIGURE 4 is a fragmentary side elevational view showing the upper end portion of an elongated, retractable element having a different shape from the corresponding portion of the retractable element shown in FIGURE 2.
Figure 4:
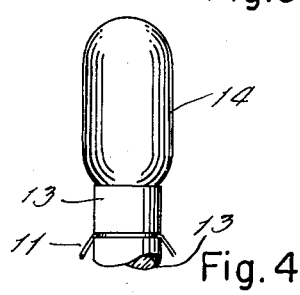

The enlarged upper end portion 14 of the glass rod 10, as shown in FIGURE 2, is spherical, while in the modification thereof shown in FIGURE 4 it is elongated.

The enlarged lower end portion 15 of the glass rod 10 has a uniformly tapered upper surface extending downwardly and radially outwardly from its juncture with the cylindrical portion of the rod 10 intermediate its ends, and has a substantially hemispherical under side.

The under side of the dust cap 6 advantageously may be coated with light reflecting material (not shown). The aluminum foil which comprises the outer covering 13 also reflects light.

The invention may be modified in various ways without departing from the spirit and scope thereof.

What is claimed is:

1. In an illuminating device for underground structures having a roof below the ground surface, in combination, a tubular housing arranged through the said roof and extending above the ground surface, a spring biased cap hinged to the top of said housing for normally closing the same, a retractable glass shaft formed with bulbous light refracting elements on each end, the said shaft having a light reflecting coating coextensive therewith between said light refracting elements, spring tensioned means on said shaft for supporting the same vertically concentrically of said housing whereby said shaft can be raised and lowered in said housing to expose the light refracting element on the upper end thereof to sunlight while holding the cap in open position against the tension of its spring, and whereby light is refracted through said shaft and said lower refracting element.

2. In a light refracting device for illuminating an underground structure having a roof and a tubular housing extending vertically through said roof, in combination with said housing, a glass shaft arranged concentrically of said housing and movable longitudinally therethrough, the said shaft having a light reflecting coating and releasable spring tensioned means for supporting the shaft in said housing, a light refracting bulbous element formed on the upper and lower ends of said shaft above and below the reflecting coating thereon whereby, when said shaft is extended above said housing sunlight is refracted through said shaft and the lowermost refracting element, and a spring biased closure for the upper end of said housing normally closing the same when said shaft is retracted and yieldable when the latter is extended.

References Cited in the file of this patent

UNITED STATES PATENTS

| 289,537 | Hyatt | Dec. 4, 1883 |
| 668,404 | Hanneborg | Feb. 19, 1901 |
| 2,395,310 | Wilson | Feb. 19, 1946 |
| 3,006,244 | Farrington | Oct. 31, 1961 |

FOREIGN PATENTS

| 15,518 | Great Britain | of 1913 |